Patented July 25, 1944

2,354,193

UNITED STATES PATENT OFFICE 2,354,193

INSECTICIDE

Charles Verne Bowen, Bethesda, Md., assignor to the United States of America as represented by Claude R. Wickard, Secretary of Agriculture, and his successors in office No Drawing. Application September 25, 1943, Serial No. 503,830

11 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

My invention relates to improvements in materials for destroying or checking the growth or multiplication of living organisms, whether plant or animal, which are economically injurious to man.

The principal object of my invention is to provide materials suitable for use as insecticides.

A further object is to provide synthetic organic insecticides which may replace insecticide materials (such as pyrethrum, rotenone, and nicotine) that are obtained from plants, and thus to provide insecticides the production of which is not influenced by such factors as climatic variations, growing conditions, localized production, and transportation.

Other objects will appear from the following description.

I have found that certain compounds of the class consisting of cinnamamide and substituted cinnamamides are toxic to insects. These compounds are represented by the formula:

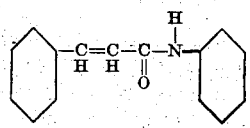

in which R and R' are of the class consisting of hydrogen, alkyl radicals, and aryl radicals.

The effectiveness of these compounds as insecticides is shown by the following entomological results.

EXAMPLE I

*Cinnamamide*

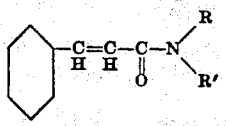

(a) When tested against screwworm larvae (*C. americana*) the minimum lethal concentration of this compound in the feeding medium was found to be between 0.05 and 0.10 percent.

(b) When tested against codling moth larvae by the apple plug method, 83 percent of the plugs were clean, that is, neither stung nor wormy. Lead arsenate at the some concentration gave the same percentage of clean plugs.

(c) When tested as a dust against fourth instar southern army worm, this compound gave a kill of 60 percent in 72 hours.

EXAMPLE II

*Cinnamanilide*

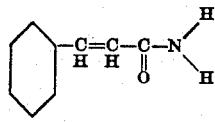

This compound at a concentration of 100 parts per million gave a kill of 77 percent in 16 hours of the mosquito larvae (*Culex quinquefasciatus*).

EXAMPLE III

*N,N-diethylcinnamamide*

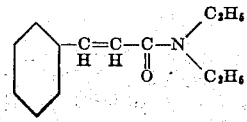

(a) When tested against screwworm larvae (*C. americana*) the minimum lethal concentration of this compound in the feeding medium was found to be between 0.025 and 0.05 percent.

(b) When tested as a dust against fourth instar melon worm, this compound gave a kill of 89 percent in 72 hours while a stronger concentration of derris gave a kill of only 70 percent in the same time.

(c) This compound gave 100 percent kill of ¾ grown okra caterpillar in 48 hours.

(d) This compound gave 100 percent kill of fourth instar southern army worm in 48 hours.

(e) When tested as a dust against fifth instar bean leaf roller, N,N-diethylcinnamamide gave a kill of 90 percent in 72 hours, while a stronger concentration of lead arsenate gave a kill of 87 percent against the same insect.

(f) When tested as a dust against fifth instar southern beet webworm this compound gave a kill of 92 percent in three days, while lead arsenate gave a kill of only 50 percent in the same time.

(g) A kill of 84 percent of second instar squash bugs was obtained in 2 days when dusted by this compound.

Other compounds of this class which were found to be toxic to insects were N-isobutylcinnamamide, N-o-tolylcinnamamide, and N-p-tolylcinnamamide.

The specific compounds cited above in describing entomological results are given merely as examples and are not intended as limitations of this invention.

Cinnamamide and substituted cinnamamides may be reduced to an impalpable powder by grinding and applied to vegetation as a dust, either alone or admixed with inert carriers, or they may be made into suspension and used as a spray. When applied as a spray in a liquid medium, it is often desirable to incorporate certain conditioners, such as dispersing agents, wetting agents, stickers and spreaders. A spray may be made by mechanically suspending the impalpable powder in the liquid medium or by first dissolving it in an appropriate solvent, such as acetone, and then pouring the resulting solution into water, whereupon a fine colloidal suspension is obtained. This may be applied directly to the host plant or may be combined with suitable conditioners and then sprayed. Also, certain of these compounds are soluble in oil and may consequently be applied as components of an oil emulsion spray.

For the control of certain types of insects, it has been found advantageous to admix certain members of this class of compounds with known insecticides, such as pyrethrum, derris, the arsenicals, phenothiazine, and so forth. The resulting action, when additive, supplements the action of the other insecticide, and on the other hand, when the action is potentiating, the efficiency of the insecticide is enhanced.

Having thus described my invention, I claim:

1. An insecticidal composition comprising, in admixture with a carrying agent, a compound represented by the formula:

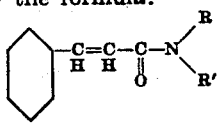

in which R and R' are selected from the group consisting of hydrogen atoms, phenyl radicals, methyl substituted phenyl radicals and alkyl radicals containing not more than four carbon atoms.

2. An insecticidal composition comprising cinnamamide in admixture with a carrying agent.

3. An insecticidal composition comprising cinnamanilide in admixture with a carrying agent.

4. An insecticidal composition comprising N,N-diethylcinnamamide in admixture with a carrying agent.

5. The process of destroying insects which comprises dusting material liable to attack by said insects with a compound represented by the formula:

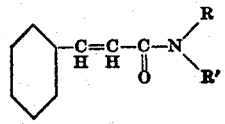

in which R and R' are selected from the group consisting of hydrogen atoms, phenyl radicals, methyl substituted phenyl radicals, and alkyl radicals containing not more than four carbon atoms.

6. The process of destroying insects which comprises spraying material liable to attack by said insects with a compound represented by the formula:

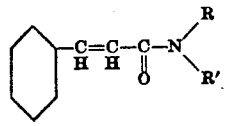

in which R and R' are selected from the group consisting of hydrogen atoms, phenyl radicals, methyl substituted phenyl radicals and alkyl radicals containing not more than four carbon atoms.

7. The process of destroying insects which comprises poisoning said insects with a compound represented by the formula:

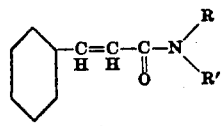

in which R and R' are selected from the group consisting of hydrogen atoms, phenyl radicals, methyl substituted phenyl radicals and alkyl radicals containing not more than four carbon atoms.

8. The process of destroying insects which comprises applying to hosts for said insects a compound represented by the formula:

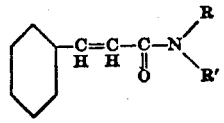

in which R and R' are selected from the group consisting of hydrogen atoms, phenyl radicals, methyl substituted phenyl radicals and alkyl radicals containing not more than four carbon atoms.

9. The process of destroying insects which comprises applying cinnamamide to hosts for said insects.

10. The process of destroying insects which comprises applying cinnamanilide to hosts for said insects.

11. The process of destroying insects which comprises applying N,N-diethylcinnamamide to hosts for said insects.

CHARLES VERNE BOWEN.